Dec. 7, 1926.
J. E. MORCE
1,609,628
ACTUATING MECHANISM
Filed Jan. 16, 1926
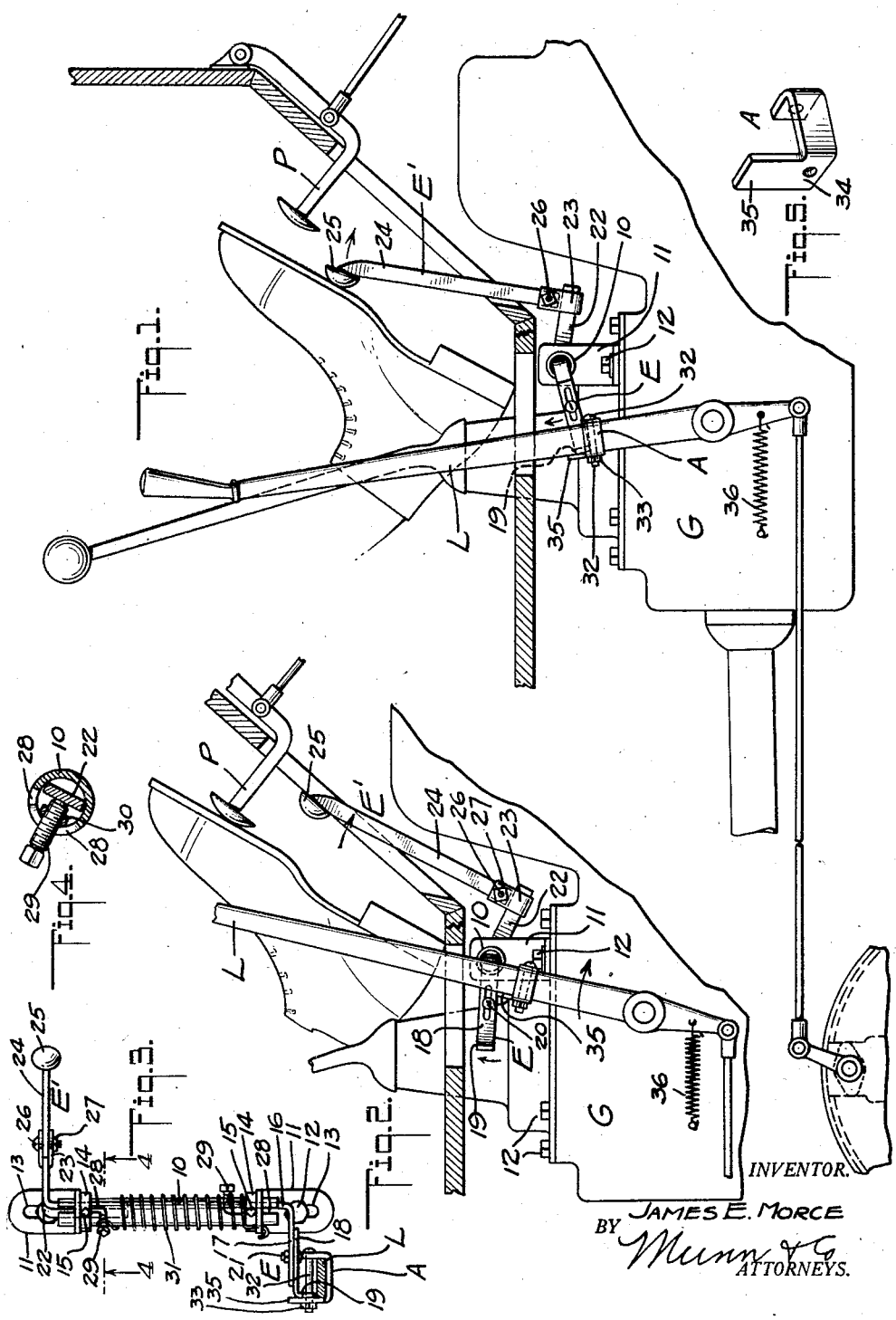
INVENTOR.
JAMES E. MORCE
BY
ATTORNEYS.

Patented Dec. 7, 1926.

1,609,628

UNITED STATES PATENT OFFICE.

JAMES E. MORCE, OF SOUTH PASADENA, CALIFORNIA.

ACTUATING MECHANISM.

Application filed January 16, 1926. Serial No. 81,774.

My invention relates to actuating mechanisms of the character embodied in my copending application filed August 6, 1925, Serial No. 48,632, which involved means for releasing a brake lever in advance of the actuation of a foot accelerator in order to prevent stalling of the vehicle.

A purpose of my present invention is the provision of a mechanism of the above described character in which the brake releasing means, upon a release of the brake lever, is caused to occupy and be maintained in a non-operable or unobstructing position with respect to the foot of the operator in the normal operation of the accelerator pedal following the initial application of the foot to the pedal to effect a release of the brake lever, whereby the brake releasing means will not interfere with or be engaged by the foot of the operator during the normal operation of the pedal, the mechanism also functioning in such manner that when the brake is subsequently applied the brake releasing means will again be positioned to be actuated upon depression of the pedal to effect the release of the lever.

A further purpose of my invention is the provision of an actuating mechanism in the form of an attachment having a wide range of adjustment to permit its convenient application to motor vehicles which would ordinarily necessitate mechanisms of different dimensions.

I will describe only one form of actuating mechanism embodying my invention, and will then point out the novel features thereof in claims.

In the drawings—

Figure 1 is a view showing in side elevation one form of actuating mechanism embodying my invention applied to a motor vehicle with the brake lever in braking position;

Figure 2 is a view similar to Figure 1, with the brake lever in non-braking position;

Figure 3 is a plan view of the mechanism embodied in Figure 1;

Figure 4 is an enlarged vertical sectional view taken on the lines 4—4 of Figure 3; and Figure 5 is a perspective view of an abutment member comprised in the device.

Referring specifically to the drawings, in which similar reference characters refer to similar parts in each of the views, my invention comprises a brake latching element and a brake releasing element designated generally at E and E' respectively, which elements are adapted to be secured to a rock shaft 10 preferably of tubular form and rotatably mounted in L-shaped brackets 11 in the present instance shown secured to the cover of the conventional gear set housing G by utilizing certain of the usual cover securing bolts indicated at 12, which extend through slots 13 formed in the horizontal portion of the brackets. By the provision of the slots 13 the brackets can be adjusted toward or away from each other to meet the bolt spacing which may vary in the gear sets of different makes of vehicles. Longitudinal movement of the shaft 10 in the brackets is prevented by means of collars 14 adjustably secured upon the shaft at the confronting sides of the brackets by means of set screws 15.

The brake latching element E is substantially L-shaped in form and preferably constructed of flat strip metal to provide legs 16 and 17, the former of which is freely insertable into one end of the shaft 10 and the latter of which is extensible to permit its length to be varied in accordance with the requirement of different vehicles. To this end a slotted arm 18, having at one end a latching lip 19, is adjustably secured to the leg 17 by means of a bolt 20 extending through the slot of the arm and through an opening in the leg 17, the bolt having a nut 21 for clamping the arm in adjusted position.

The brake-releasing element E' is preferably constructed to provide an L-shaped lever 22 formed of flat strip metal, one leg of which is freely insertable into the other end of the shaft 10. A U-shaped strap 23 receives the other leg of the lever and an arm 24 having a head 25 adapted to be engaged by the foot of an operator extends through an opening in the floor boards of the vehicle adjacent its accelerator pedal P, and is adjustably mounted on the strap 23 by means of a bolt 26 extending through registering openings in the arm and strap. The bolt is provided with a nut 27 by which the arm is clamped to the strap and the strap to the lever 22. By this arrangement the arm can be adjusted angularly with respect to the lever 22 and longitudinally thereof to meet the requirement of a particular vehicle.

The elements E and E' are adjustable circumferentially and longitudinally with respect to the shaft 10 and to provide means for securing the elements to the shaft in the desired adjusted position, the shaft is provided with L-shaped slots 28 extending longitudinally and transversely of the shaft, with the longitudinal portion of the slots extending inwardly from the ends of the shaft. By this arrangement of slots, bolts 29 having nuts 30 can be inserted from the ends of the shaft into the transverse portion of the slots, with the nuts applied and disposed within the shaft. To clamp the elements E and E' in adjusted position against movement in the shaft the bolts 29 are rotated and fed through the nuts 30, the latter engaging the inner wall of the shaft and remaining stationary while the bolts engage and force the inserted ends of the elements against the opposite wall of the shaft.

A coil spring 31 secured at one end to one of the bolts 29 and at its other end to one of the brackets 11 surrounds the shaft 10 and normally urges the latter and the elements E and E' to the brake latching position shown in Figure 1, in which the head 25 of the drum 24 is disposed above the plane of the accelerator pedal P and in the path of movement of the foot of the operator when positioned to depress the pedal. In this position the brake latching element E is urged into engagement with a U-shaped abutment A (Figure 5) adjustably secured to the brake lever L of the vehicle by means of a bolt 32 extending through registering openings formed in the arms of the abutment and provided with a nut 33. One of the arms 34 of the abutment is extended as illustrated at 35, the extension projecting upwardly when the abutment is in applied position on the lever L and functioning as a cam to actuate the latching element E in a manner to be hereinafter described. The lever L is connected in any desired manner to a conventional form of brake and is normally urged to the released position shown in Figure 2 by an expansible spring 36, as will be understood.

In operation, and with the brake lever L in the braking position shown in Figure 1, the lip 19 of the brake latching element E rests upon the bolt 32 of the abutment A under the urging action of the spring 31 and engages the inner side of the arm 34 of the abutment, thus maintaining the lever in its braking position to prevent movement of the vehicle. As previously stated, in this position the head 25 of the arm 24 projects above the plane of the accelerator pedal P, hence upon movement of the foot of the operator to depress the pedal the brake releasing element will be first depressed to rock the shaft 10 and the latching element E sufficiently to disengage the latching lip 19 from the abutment A. Under the action of its spring 36 the brake lever L now moves to the released position shown in Figure 2 and during this movement the extension 35 engages the under side of and elevates the leg 17 to further rock the latching element E which, through the medium of the shaft 10, further depresses the brake releasing element E' to the position shown in Figure 2, in which it is beyond the range of movement of the foot in the normal actuation of the accelerator pedal. The extension 35 maintains the element E in this non-obstructing position while the brake lever L occupies its released position so that the accelerator pedal is left free and unobstructed for actuation during the operation of the vehicle, and the unnecessary depression of the element each time the pedal is actuated. When the brake lever is again moved to braking position the elements E and E' return to their normal positions shown in Figure 1 under the action of the spring 31 and the lip 19 again moves into latching engagement with the abutment A to latch the lever in braking position.

Although I have herein shown and described only one form of actuating mechanism embodying my invention, it is to be understood that various changes and modifications may be made therein without departing from the spirit of the invention, and the scope and spirit of the appended claims.

I claim:

1. A brake releasing device for motor vehicles comprising means for latching a brake lever in braking position, means operatively associated with the first means and mounted for movement to occupy one position in which it is disposed in the path of movement of the foot when positioned to depress the accelerator pedal of the vehicle to effect a release of the lever and a second position in which it is incapable of operation by depression of the pedal, and means for moving the last means to the second mentioned position upon the release of the lever to allow free and unrestricted actuation of the pedal.

2. A brake releasing device for motor vehicles comprising means for latching a brake lever in braking position, means disposed in the path of movement of the foot when in the act of depressing the accelerator pedal of the vehicle for releasing the brake lever, and means operable upon the release of the lever for causing the second means to occupy a position in which it is out of the range of movement of the foot when subsequently depressing the pedal, whereby free and unrestricted movement of the pedal is effected.

3. A brake releasing device as embodied in claim 1, wherein said last means is operable when the lever is moved to brake applying position to permit the second means to return to the first mentioned position.

4. In combination, a brake-lever, an accelerator pedal, means for latching the lever in braking position, means arranged in the path of movement of the foot when in the act of depressing the pedal for releasing the brake lever, and means operable upon a release of the lever for moving the second means to a position in which it is incapable of operation by depressing of the pedal and maintaining it in such position until the lever is again moved to brake applying position.

5. In combination with the brake lever of a motor vehicle, means for latching the lever in brake applying position, means arranged in the path of movement of the foot when in the act of depressing the accelerator pedal of the vehicle for releasing the lever, and means operable upon the release of the lever by which the second means is moved to a position out of the range of movement by the foot when subsequently depressing the pedal and is maintained in such position until the lever is again moved to brake applying position.

6. In combination, a brake lever normally urged to non-braking position, means for latching the lever in braking position, means operatively connected to the said means and arranged in the path of movement of the foot when in the act of depressing the accelerator pedal of the vehicle for releasing the lever, and means on the lever operatively associated with the latching means and operable upon the release of the lever to move the second mentioned means to a position in which it is incapable of operation upon subsequent depression of the pedal and maintaining it in such position until the lever is again moved to braking position.

7. A brake releasing device for motor vehicles comprising means for latching a brake lever in braking position, brake releasing means mounted for movement to occupy one position in which it is disposed in the path of movement of the foot when positioned to depress the accelerator pedal of the vehicle and a second position in which it is incapable of operation by the foot, and means for moving the brake releasing means to the second said position when the brake is released.

8. A brake releasing device for motor vehicles comprising means for latching a brake lever in braking position, brake releasing means operatively associated with the latching means and normally urged to one position in which it is adapted to be actuated by the foot of an operator when positioned to depress the accelerator pedal of the vehicle and thereby effect a release of the lever, said brake releasing means movable to occupy another position in which it is incapable of operation by the foot upon depression of the pedal, and means for moving the brake releasing means to the last mentioned position when the lever is released.

9. A brake releasing device for motor vehicles comprising means for latching a brake lever in braking position, brake releasing means operatively associated with the latching means and normally urged to one position in which it is adapted to be actuated by the foot of an operator when positioned to depress the accelerator pedal of the vehicle and thereby effect a release of the lever, said brake releasing means movable to occupy another position in which it is incapable of operation by the foot upon depression of the pedal, and means for moving the brake releasing means to the last mentioned position when the lever is released, and permitting the return of the brake releasing means to the first said position under the action of its urging means when the lever is again moved to braking position.

10. A brake releasing device for motor vehicles comprising a latch lever movably mounted upon a support and normally urged to brake latching position, an abutment adapted to be secured to a brake lever so as to be engaged by said latch lever when the brake lever is in braking position, means operatively connected to the latch lever and disposed in the path of movement of the foot when in the act of depressing the accelerator pedal of the vehicle for causing disengagement of the latch lever from said abutment to effect a release of the brake lever, and means operable upon the release of the brake lever for moving the last mentioned means to a position in which it is incapable of operation upon depression of the pedal and maintaining it in such position until the brake lever is again moved to braking position.

11. A brake releasing device as embodied in claim 10, wherein said last means comprises an extension formed on said abutment and adapted to engage and move the latch lever when the brake lever is released.

12. A brake releasing device comprising a pair of brackets adapted to be secured to a support, a tubular shaft rotatably mounted in the brackets, a latch lever having a portion thereof extending into one end of the shaft so as to be capable of circumferential and longitudinal adjustment with respect to the shaft, a brake releasing lever having a portion thereof extending into the other end of the shaft so as to be capable of rotatable and longitudinal adjustment with respect to the shaft, means for urging the shaft to rotate in one direction, means for securing the levers in adjusted position in the shaft, an abutment comprising a U-shaped member adapted to be secured to a brake lever and adapted to be engaged by the latch lever when the brake lever is in braking position, and an extension on the abutment adapted to engage and move the latch lever when the brake lever is moved to non-braking position.

13. A brake releasing device as embodied in claim 12, wherein the wall of said shaft is slotted transversely adjacent each end, and said securing means comprises set screws extending through said slots and adapted to engage said portions of the levers, and nuts threaded on said screws within said shaft.

14. A brake releasing device as embodied in claim 12, wherein said latch lever is formed in sections adjustable upon each other in a manner to vary the length of the lever, and means for securing the sections in adjusted position.

15. A brake releasing device as embodied in claim 12, wherein the brake releasing lever comprises an L-shaped arm, a second arm having a head adapted to be engaged by the foot of an operator, a U-shaped strap embracing one leg of the L-shaped arm, and a bolt extending through registering openings formed in the strap and second arm and having a nut for clamping the latter arm to the strap and the strap to the first arm.

16. A brake releasing device as embodied in claim 12, wherein said brackets are L-shaped and slotted to receive bolts and thereby permit adjustment of the brackets toward or away from each other upon a support.

17. A brake releasing device comprising brackets adapted to be secured to a support, a rock shaft mounted in the brackets, a latch lever adjustable on the shaft, a brake releasing lever adjustable on the shaft, means for locking the levers against movement on the shaft, an abutment adapted to be secured to a brake lever and adapted to be engaged by the latch lever when the brake lever is in braking position, and means on the abutment adapted to engage and move the latch lever when the brake lever is moved to non-braking position.

JAMES E. MORCE.